US009899053B1

(12) United States Patent
Leach et al.

(10) Patent No.: US 9,899,053 B1
(45) Date of Patent: Feb. 20, 2018

(54) PROTECTING AGAINST UNAUTHORIZED FIRMWARE UPDATES USING INDUCED SERVO ERRORS

(71) Applicant: Seagate Technology LLC, Cupertino, CA (US)

(72) Inventors: Leroy L. Leach, Boulder, CO (US); Todd D. Baumann, Berthoud, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/290,551

(22) Filed: Oct. 11, 2016

(51) Int. Cl.
*G11B 5/596* (2006.01)
*G11B 20/00* (2006.01)
*G11B 5/55* (2006.01)

(52) U.S. Cl.
CPC ...... *G11B 20/00166* (2013.01); *G11B 5/5534* (2013.01)

(58) Field of Classification Search
None
See application file for complete search history.

(56) References Cited

U.S. PATENT DOCUMENTS 5,544,135 A 8/1996 Akin, Jr. et al.
7,006,312 B2 2/2006 Ehrlich
7,193,798 B2 * 3/2007 Byrd ................ G11B 20/10009 360/39
7,907,729 B2 3/2011 Morrow et al.
8,588,756 B2 11/2013 Baldan
9,110,761 B2 8/2015 Nelson et al.
9,235,404 B2 1/2016 Cavalaris et al.
2002/0002080 A1 1/2002 Stockdale
2009/0271603 A1 10/2009 Wang
2012/0151199 A1 6/2012 Shriver
2014/0130151 A1 5/2014 Krishnamurthy et al.
2014/0250290 A1 9/2014 Stahl et al.
2015/0143163 A1 5/2015 Dasari et al.

* cited by examiner

*Primary Examiner* — K. Wong
(74) *Attorney, Agent, or Firm* — Hall Estill Attorneys at Law

(57) ABSTRACT

Method and apparatus for data security in a data storage device. In some embodiments, a first version of firmware is installed in a memory of the device. The firmware is used by a programmable processor to control accesses to a rotatable data recording medium on which is written pre-recorded servo positioning data used to position a data transducer. A newer, second version of the firmwave is subsequently installed in the memory to replace the first version of firmware. The second version of the firmware includes an instruction to corrupt a selected portion of the servo positioning data on the medium in order to authenticate the second version of the firmware. During a subsequent initialization of the device, host access is granted based on detection of the corruption of the selected portion of the servo positioning data.

20 Claims, 5 Drawing Sheets

PROTECTING AGAINST UNAUTHORIZED FIRMWARE UPDATES USING INDUCED SERVO ERRORS

SUMMARY

Various embodiments of the present disclosure are generally directed to a method and apparatus for preventing an unauthorized firmware update to a data storage device by intentionally inducing errors in selected servo data locations on a rotatable data storage medium.

In some embodiments, a method includes installing a first version of firmware in a memory used by a programmable processor of a data storage device having a rotatable data recording medium on which is written pre-recorded servo positioning data used to position a data transducer. A newer, second version of the firmware is subsequently installed in the memory to replace the first version of firmware, the second version of the firmware including an instruction to corrupt a selected portion of the servo positioning data on the medium.

In further embodiments, a method includes providing a data storage device having a programmable processor, a memory, a rotatable data recording medium, and a data transducer configured to be positioned adjacent tracks defined on the medium to read data therefrom and write data thereto, the tracks comprising spaced apart servo fields which store servo positioning data to control the position of the transducer; installing firmware to the memory; using the programmable processor to, responsive to execution by the programmable processor of the firmware, direct the data transducer to overwrite a selected servo field on a selected track to corrupt the servo positioning data stored therein; and subsequently using the programmable processor to, responsive to execution by the programmable processor of the firmware, direct the data transducer to read the selected servo field on the selected track and, responsive to an error condition associated with the corrupted servo positioning data of the selected servo field, authorize access to remaining portions of the medium by a user.

In further embodiments, a data storage device has a rotatable data recording medium on which is defined a plurality of concentric tracks, each track having spaced apart servo positioning data. A data transducer is configured to write data to and read data from the tracks. A servo control circuit is configured to position the data transducer adjacent the tracks using the servo positioning data. A memory stores a selected version of firmware. A programmable processor is configured to, responsive to execution of the firmware, direct the data transducer to overwrite a selected servo field on a selected track to corrupt the servo positioning data stored therein, direct the data transducer to subsequently read the selected servo field on the selected track and, responsive to an error condition associated with the corrupted servo positioning data of the selected servo field, authorize access to remaining portions of the medium by a user.

These and other features of various embodiments can be understood with a review of the following detailed description in conjunction with the accompanying drawings.

DETAILED DESCRIPTION

Figure 1:
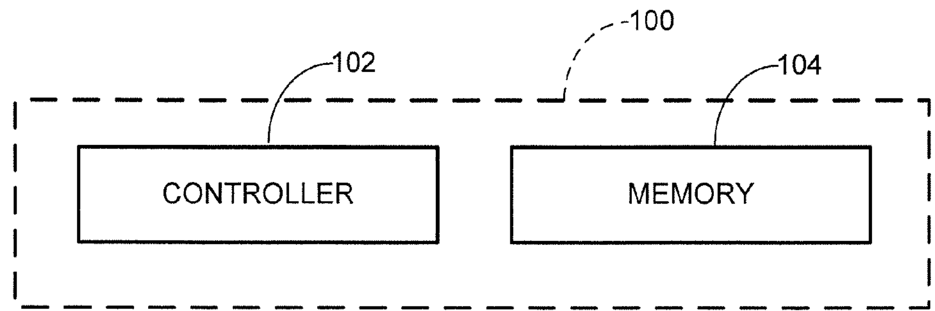
FIG. 1 is a simplified functional block diagram of a data storage device constructed and operated in accordance with various embodiments of the present disclosure.

The present disclosure is generally directed to the area of data storage, and more particularly, to the authentication of firmware used by a data storage device.

Data storage devices are configured to store and retrieve data from a host device in a fast and efficient manner. Such devices are often provided with a top level control circuit (controller) and one or more forms of data storage media, such as rotatable magnetic recording media (discs) in hard disc drives (HDDs) or solid-state memory cells in solid-state drives (SSDs). Another form of data storage device is a so-called hybrid solid state drive (HSSD) which uses both rotatable media and solid state memory to store user data.

HDDs and HSSDs generally arrange the rotatable magnetic recording media so as to be rotated at a constant angular velocity. A corresponding array of data read/write transducers (heads) move across the recording surfaces of the rotatable media to write and read data to fixed sized sectors arranged along concentric data tracks. Embedded servo data may be supplied on the recording surfaces to provide positional information used by a servo control circuit to maintain the transducers in a desired relation to the data tracks. The servo data may be arranged as spaced apart servo wedges that extend radially across the discs. Each wedge is formed from a number of radially adjacent servo fields. Data sectors can be defined during a formatting operation in the spaces between adjacent pairs of the servo fields at a given radius to provide a series of concentric tracks.

Data storage device controllers are often realized as programmable processors that utilize programming (firmware) that is maintained in a non-volatile memory location, such as flash memory, disc memory, etc. During device initialization, the firmware (or a portion thereof) is loaded to a local volatile memory, such as DRAM, and sequentially executed by the processor(s) of the device to place the device in an operationally ready state. Thereafter, the firmware is used to control the operation of the device during normal data transfers with a host device. For reference, the term "firmware" as used herein will be understood broadly as computerized instructions stored in a memory and executed by a programmable processor to control the operation of the device. Firmwave may alternatively be referred to as software, code, programming instructions, executable data, scripts, etc.

One advantage of the use of firmware is that the system hardware architectures (e.g., processors, buffers, support circuitry, etc. associated with a given chip set) can be stabilized over time and used on a number of different generations of products. New features and capabilities can be added by revisions or updates to the firmware. Firmware thus provides a certain amount of flexibility with new product development as well as with addressing limitations or problems discovered later on during the life cycle of a product, since a firmware upgrade is far less intrusive than the installation of new, replacement hardware circuitry.

As with other forms of electronic devices, it is common for a new data storage device product to be commercially released for field use by end users with a first version of the firmware. Extensive development and testing processes are carried out in an effort to evaluate the first commercialized version of the firmwave. Periodic updates of the firmware (so-called firmware revisions, or new firmware versions) are subsequently provided to the devices in the field to add additional features, solve security problems or holes in the previous firmware, address deficiencies in operation associated with the previous firmware, etc. No inally, the latest firmware version is cut into the existing manufacturing process around this same time so that newly shipped devices are usually shipped with the then-existing latest firmware.

A problem thus arises with regard to device security and operability. So-called "rollback attacks" are efforts by an attacking party to gain access to a device by attempting to install a previous version of the firmwave. In this way, the attacking party may be able to gain access to data or other content stored on the device by exploiting deficiencies in the previous version of the firmware.

A number of rollback protection techniques have been proposed in the art. Many of these techniques relate to an authentication sequence during a firmware upgrade operation to ensure that the agent or other person attempting the firmware update is authorized to carry out the update, and the newly loaded firmware is authentic and being provided from an authorized source. While operable, if such access is granted, sophisticated attackers can thereafter install any number of different types of firmware upgrades, including previous versions or newly created unauthorized versions, in an effort to gain access to the customer data stored on the device or for other malicious purposes.

Accordingly, various embodiments of the present disclosure are generally directed to an apparatus and method to protect against unauthorized firmware upgrades, including but not limited to firmware rollback attacks.

As explained below, some embodiments generally operate to install a first version of firmware in a memory used by a programmable processor of a data storage device having a rotatable data recording medium. The first version of firmware may include an instruction to corrupt a first set of servo positioning data on the medium at a selected location. A newer, second version of the firmware is subsequently installed to the device. The second version of the firmware includes an instruction to corrupt a second set of servo positioning data on the medium. Each subsequently loaded version of the firmware similarly may provide instructions to corrupt additional sets of servo positioning data in further locations.

Each authorized version of the firmware is configured to perform a check during an initialization operation for corrupted servo positioning data locations. Since later versions provide corruptions in selected locations that were still "good" for previous versions, the detection of corrupted servo data in locations that should be good locations can be used to prevent the operation of the firmware.

In some embodiments, the corruption of the servo data is selected to be of the type that cannot be reliably replaced by the device. An example is servo positioning burst patterns in selected servo fields. Such burst patterns are written during manufacturing using specialized test equipment, and normally cannot be replaced once erased, overwritten, or otherwise modified by the storage device. Other forms of servo positioning data may also be corrupted, such as synchronization fields, index fields, track address fields, repeatable runout (RRO) compensation fields, etc. The corruptions may be applied to a special set of authentication tracks dedicated to this purpose, although other data tracks may be used as well.

In this way, each version of firmware has associated with it a particular corruption or error signature associated with one or more data tracks that indicate the location of the intentionally induced errors. Each successive version of firmware will include, in its signature, all of the induced errors of all previous versions of firmware, plus one or more additional errors. The firmware checking routine thus verifies both the existence of errors in the intended locations as well as the lack of errors in other locations.

It is possible, albeit statistically unlikely, that grown defects such as thermal asperities may arise over time that induce additional errors in specific locations that may affect the ability of the firmware to adjudge the locations of the intentionally induced errors. For example, an additional error may be present on a given set of the authentication tracks. To address this, multiple errors may be induced for each firmware revision upgrade. Periodic scans of the authentication tracks can also be carried out and any newly exhibited errors can be logged to a defect map or other data structure. Moreover, the characteristics of a given grown defect, that may span several adjacent tracks, can be evaluated to distinguish between intentionally induced defects and naturally occurring defects.

These and other features and advantages of various embodiments of the present disclosure can be understood beginning with a review of FIG. 1 which provides a simplified representation of a data storage device 100 of the type used to store and retrieve user data from a host device. The device 100 includes a controller (control circuit) 102 and a memory module 104.

The controller 102 is a programmable processor based control circuit that provides top level communication and control functions as the device interfaces with the host device. Suitable programming instructions (firmware) are stored in a memory and executed by the processor as required to carry out the requisite functions.

Data from the host device is transferred for storage in the memory 104 responsive to a host write command, and returned back to the host from the memory responsive to a host read command. The memory can take a variety of forms, including rotatable magnetic recording media as set forth in FIG. 2.

Figure 2:
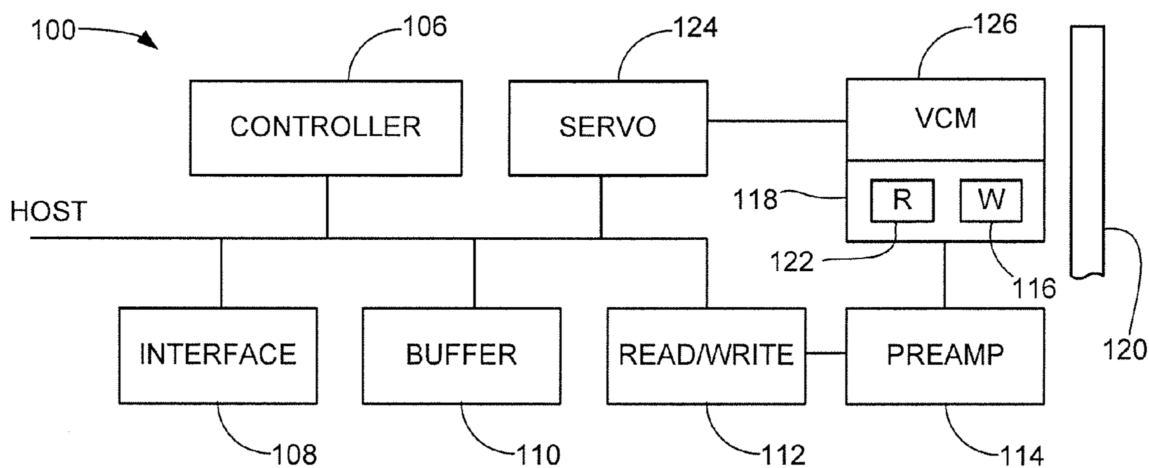
FIG. 2 is a schematic representation of aspects of the data storage device of FIG. 1 characterized as a hard disc drive (HDD) in accordance with some embodiments.

FIG. 2 is a generalized functional representation of the data storage device 100 of FIG. 1 in accordance with some embodiments. The internal architecture can vary as required so FIG. 2 is meant to convey a general overview of various systems, circuits and components. Other forms can be used.

The device 100 in FIG. 2 is characterized as a hard disc drive (HDD), although other forms of data storage devices can be readily adapted to incorporate the various embodiments presented herein. The HDD device 100 includes a top level controller (control circuit) 106, which may correspond to the controller 102 in FIG. 1. A host interface circuit 108 provides communications with the external host under the direction of the controller 106, including the processing of data transfers, commands, status requests, etc. A buffer memory 110 provides for the temporary storage of user data pending transfer to/from the host, and may store other data as well such as control parameters, programming used by the controller 106, etc.

A read/write (R/W) channel circuit 112 provides signal conditioning during write and read operations. User data to be written by the device 100 are encoded by a write portion of the channel 112 such as via encryption, compression, run length limited (RLL) encoding, error detection and correction (EDC) encoding, etc. Encoded data are supplied to a preamplifier/driver (preamp) circuit 114 which applies bi-directional, time varying write currents to a write element (W) 116 of a data transducer 118. The write element 116 may take the form of a perpendicular write coil that writes a corresponding sequence of magnetic flux transitions to tracks defined on a rotatable recording medium (disc) 120.

During a read operation to recover previously written data, a read element (sensor) 122 of the transducer 118 detects the magnetic pattern to generate a readback signal that is preamplified and conditioned by the preamp 114 and forwarded to the channel 112. A read portion of the channel 112 applies signal processing to the recovered signal including detection, decoding, decryption, decompression, error detection and correction, etc. to output the originally stored data to the buffer 110. The interface 108 thereafter transfers the data to the requesting host. The read sensor 122 can take a variety of forms, such as a magneto-resistive (MR) sensor or the like.

A servo control circuit 124 operates to position the respective write and read elements 116, 122 adjacent the disc 120 during read and write operations. Servo data written to the disc 120 are detected by the read sensor 122, demodulated by the channel 112 and processed by the servo control circuit 124 to generate a position signal indicative of the radial position of the read sensor. A corresponding current command signal is input to a voice coil motor (VCM) 126 affixed to the transducer 118 to adjust the position of the transducer accordingly. It is contemplated that the VCM 126 and the transducer 118 are supported by a rotary swing-arm type actuator 128 which causes the transducer to take an arcuate path across the disc 120. Because of this path, as well as the fact that a gap exists between the respective write element 116 and read sensor 122, the transducer 118 may be positioned in slightly different radial locations when accessing a selected track for respective write and read operations to bring the associated transducer element (reader or writer) in a desired relation to the associated track.

Figure 3:
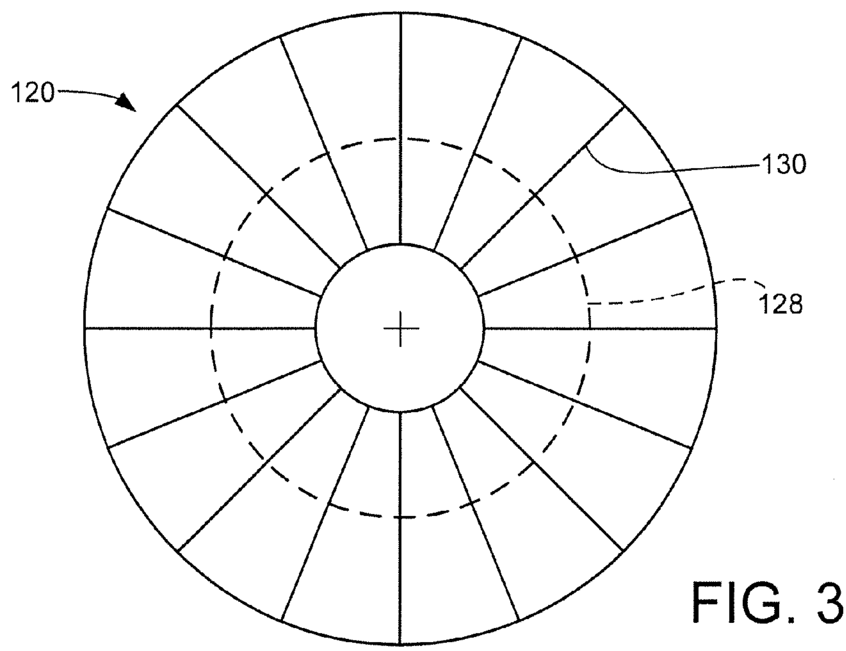
FIG. 3 shows a rotatable magnetic recording medium (disc) from FIG. 2.

FIG. 3 depicts the magnetic recording disc 120 from FIG. 2 in accordance with some embodiments. One exemplary track is denoted in broken line fashion at 128. In practice, adjacent tracks are provided across the media recording surface of the disc 120 from an outermost diameter (OD) to an innermost diameter (ID). Zone based recording (ZBR) techniques may be employed so that the tracks are arranged into concentric zones. In ZBR recording, all of the tracks 128 in each zone are written at a constant frequency, with a different selected frequency for each zone. This allows higher recording frequencies to be utilized adjacent the OD of the disc and lower recording frequencies adjacent the ID of the disc.

Servo data fields 130 are arranged in the form of spaced apart servo wedges that radially extend across the disc recording surfaces much like spokes on a wheel. The servo data fields 130 store the servo data utilized by the servo circuit 124 to provide positional control of the transducer(s) as discussed above in FIG. 2. While only a few servo fields 130 are shown in FIG. 3 for purposes of illustration, it will be understood that a larger number of servo fields will usually be provided per track, such as but not limited to about 200-400 servo fields per track. Unlike the user data, the servo data may be written at a nominally constant frequency irrespective of radial position.

Figure 4:
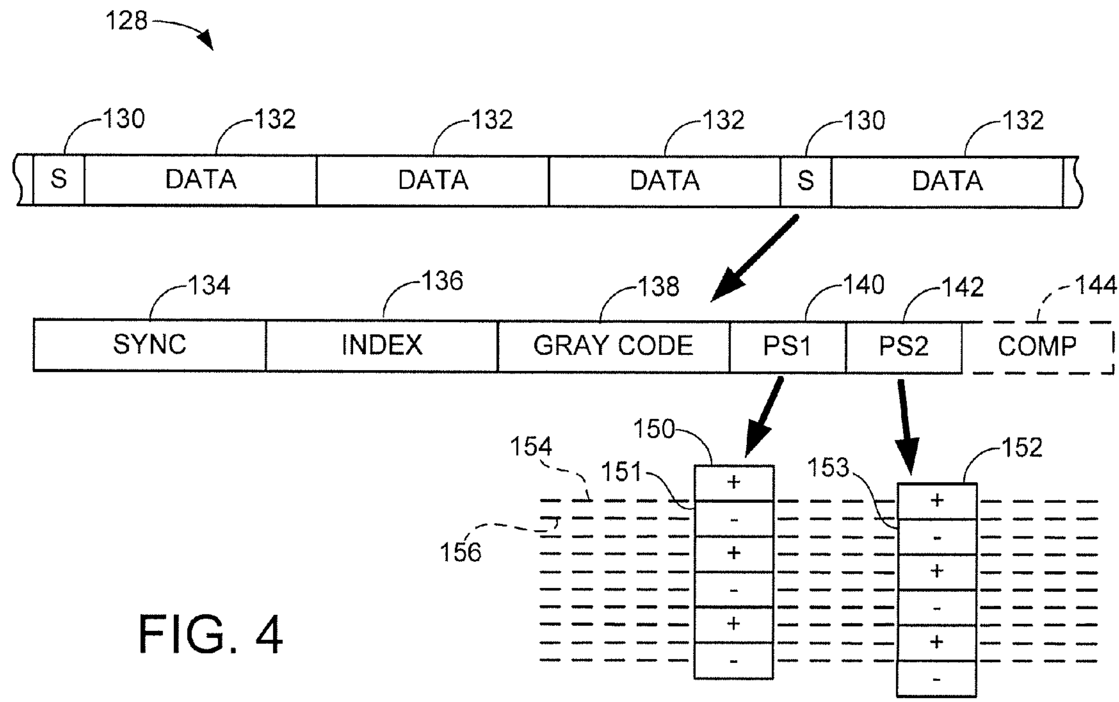
FIG. 4 shows an exemplary format for servo and data tracks defined on the data recording surface of FIG. 2.

FIG. 4 provides a generalized format for the exemplary track 128 from FIG. 3. Other formats can be used. The servo fields 130 from FIG. 3 are denoted as (S) fields. Regions between adjacent pairs of the servo fields 130 are used to define a series of data blocks, or data sectors 132. The data sectors each store a fixed amount of encoded user data, such as 512 bytes.

An exemplary format for each servo field 130 can include a synchronization (sync) field 134, an index field 136, a Gray code (track ID) field 138, and servo positioning fields PS1 140 and PS2 142. Other formats can be used. One or more optional compensation (comp) fields 144 can be appended to at least certain ones of the servo fields 130 to store RRO compensation values. The RRO compensation values are used to correct for radial misalignments of the PS1/PS2 fields 140, 142 to enable the head to nominally follow a concentric circular path along each track.

Generally, the sync field 134 is a unique bit sequence to signal to the servo circuit passage of a servo field 130 adjacent the transducer 114. The index field 136 signifies the angular position of the servo field, and the Gray code field 138 signifies the radial position of the servo field on the disc surface.

The PS1 and PS2 fields 140, 142 are alternating servo burst fields with variable polarities as shown. The PS1 fields 140 are each arranged as radially aligned positive (+) burst fields 150 and negative (−) burst fields 151. The PS2 fields 142 are similarly arranged as +burst fields 152 and −burst fields 153. Servo nulls 154 are defined at the juncture between each adjacent pair of the bursts 150, 151 in the PS1 fields 140, and servo nulls 156 are defined at the junction between each adjacent pair of the bursts 152, 153.

The PS1 and PS2 fields are radially offset to define the nulls 154, 156 at half-track locations. These define so-called servo tracks which can be used to define the locations of the data sectors 132. The position of the read sensor 122 with respect to the track 128 (see FIGS. 2-3) can be determined in relation to the relative amplitude and phase of the outputs provided by the PS1 and PS2 fields.

The servo fields 130 are normally written during device manufacturing. A number of servo writing techniques are known in the art. One approach involves the use of so-called multi-disc writers (MDWs) in which the servo wedges are written to a population of discs (such as 120) in a specially configured MDW station. Once written, the discs are installed into the respective storage devices with the pre-written servo data thereon. Another approach involves the use of so-called self-servo writing (SWW) in which the discs are installed and the heads of the storage devices are used to write the servo data in situ.

Regardless of the manner in which the servo data fields are written, it will be noted that, generally, the storage device is not configured to easily replace the servo data should the data be overwritten or otherwise modified. Normally, careful control of the write gate functions of the control circuitry in FIG. 2 operate to ensure that the device does not over-write the servo data. Such controls, of course, are selectively released in accordance with the present disclosure, as will be discussed below.

Figure 5:
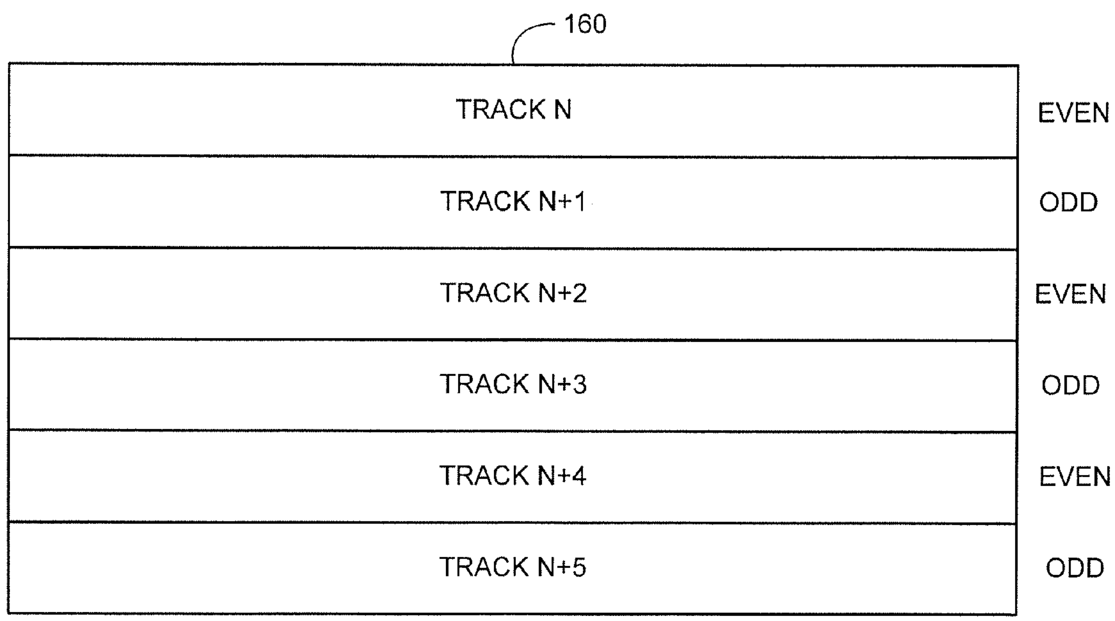
FIG. 5 shows alternating (even and odd) data tracks in accordance with some embodiments.

FIG. 5 shows a number of adjacent tracks 160 similar to the track 128 in FIG. 4. The tracks are arbitrarily denoted as track N to track N+5. It is contemplated that the tracks 160 reside within a given concentric zone on the disc 120. The tracks are divided into alternating odd (bottom) and even (top) tracks, with each even track disposed between an adjacent pair of the odd tracks. It is contemplated that odd and even tracks such as the tracks 160 in FIG. 5 are written using interlaced magnetic recording (IMR) techniques so that a first type of the tracks, such as the odd tracks, are written first (e.g., the bottom tracks), followed by the writing of the even tracks (the top tracks). Such is merely illustrative and is not limiting.

Figure 6:
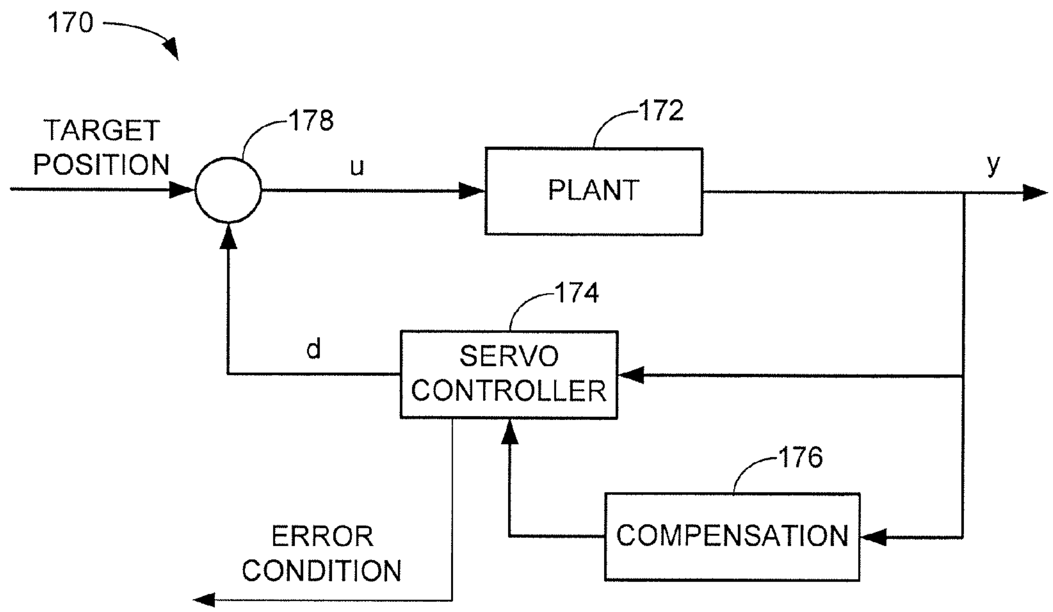
FIG. 6 is a functional block diagram for a closed loop servo circuit of the data storage device of FIG. 2 in accordance with some embodiments.

FIG. 6 provides a functional block diagram of a servo control circuit 170 of the data storage device 100 in some embodiments. The circuitry 170 is generally incorporated into the servo control block 124 of FIG. 2. A plant block 172 represents the transducer 118, VCM 126 and disc 120 of a given head/disc interface. A feed forward servo controller, also sometimes referred to as an observer or observer/predictor, is denoted at 174. A compensation circuit is represented at 176, and a summing junction at 178. Other circuits may be included in the loop such as filters, gain compensators, disturbance rejection circuits, etc. These and other features have been omitted for purposes of simplicity but can readily be used as desired.

The servo controller 174 may be realized using a programmable processor with associated programming instructions (firmwave) that are executed by the processor. In some cases, the servo firmware used by the servo circuit 170 may form a portion of the overall firmware discussed above, and thus may also be subject to upgrades from time to time. The servo controller 174 may also be referred to as an observer, an observer/predictor, etc.

Input to the plant 172 is a current command signal u. The output from the plant 172 is a position y indicative of the resulting position of the transducer as a result of the input correction value. The position y is fed to the servo controller 174 which uses plant modeling and estimating features to enable the outputting of a control signal d.

The position y is further fed to the compensation block 176 which utilizes the RRO compensation values discussed above in FIG. 4 to selectively provide correction inputs to the controller 174 in generating the control signal d. A target position indicative of the desired position of the head is summed at summing junction 178 with the control signal d to provide the input current command u to the plant.

A state estimator model may be used so that a multiple of estimated positions of the head are supplied in between the occurrence of the servo fields 130 (FIG. 4). That is, the servo controller 174 normally receives and uses the servo information from each servo field 130, including the PS1/PS2 data (fields 140, 142) to generate the control signal d. Additional estimates of head position, and associated control outputs, may be provided at samples between adjacent pairs of the servo fields.

At such time that a particular servo field cannot be read, this information may result in the output of an error condition signal by the servo controller 174, as represented in FIG. 6. During normal data read/write operations, detection of such error conditions may result in the marking of the location as a defective servo field. Other corrective actions may take place as well, such as the deallocation of adjacent data sectors in the vicinity of the error condition (defect). Such data may be written to a defect map that tracks the locations of defects and other information associated therewith.

Figure 7:
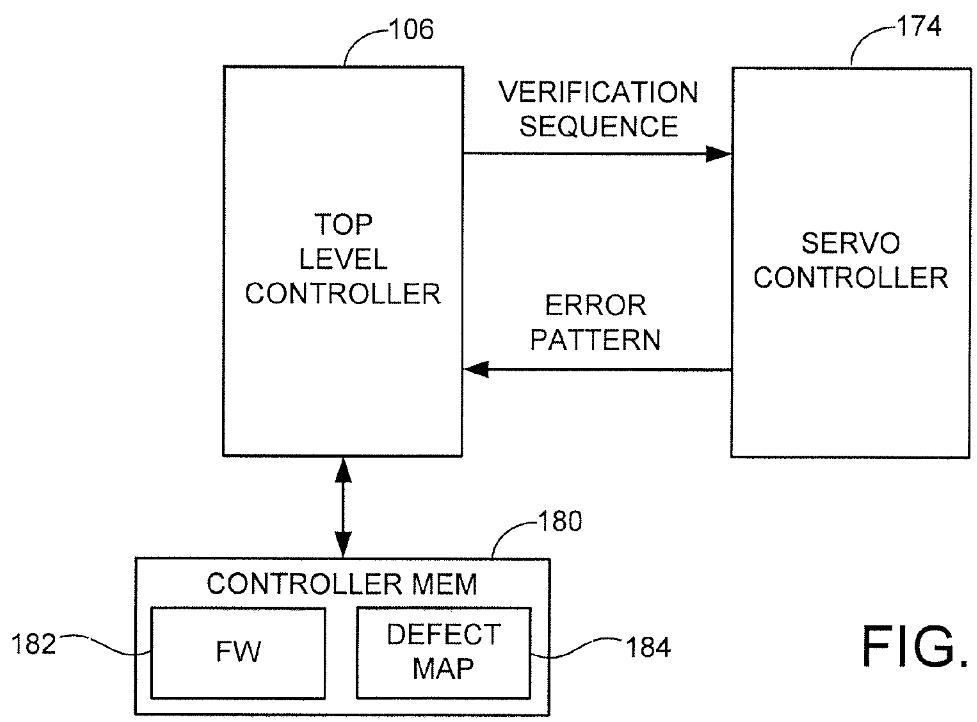
FIG. 7 depicts operation of the top level controller and the servo controller under the control of firmware in accordance with some embodiments.

FIG. 7 is a simplified functional block diagram showing the top level controller 106 from FIG. 2 and the servo controller 174 from FIG. 6 to illustrate operation of the device 100 in some embodiments. A controller memory (mem) 180 is shown to store firmware (FW) 182 and a defect map 184. It will be appreciated that the defect map and firmware may be alternatively or additionally accessed by the servo controller 174, and other types of control data (including physical to logical address translation tables, etc.) may be maintained throughout the system but have been omitted for clarity. The firmware 182 generally represents the firmware utilized by the top level controller 106, and as desired, the servo controller 174 as well. The defect map 184 stores the locations of various defects that have been detected on the device. These will include grown defects detected during the operation of the device and other information as indicated above. In some cases, the corrupted servo data fields used for firmwave verification may also be indicated in the defect map 184. In other cases, these defects are specifically excluded from the map.

Generally, FIG. 7 represents aspects of a firmware authentication sequence that may be carried out, for example, during device initialization. Other forms of FW authentication can take place, such as at times when new FW are loaded. The top level controller 106 issues a series of commands corresponding to a verification sequence to the servo controller 174. This may include commands to cause one or more of the heads to be positioned adjacent one or more authentication tracks on the media surface.

As the tracks are scanned, defective servo fields are reported by the servo controller 174 to the top level controller 106 in the form of an error pattern. If the reported error pattern matches the expected pattern, the top level controller 106 authenticates the firmware and authorizes further operation of the device. If the reported error pattern does not match the expected pattern, the top level controller 106 may operate to deny further access to the device.

Figure 8:
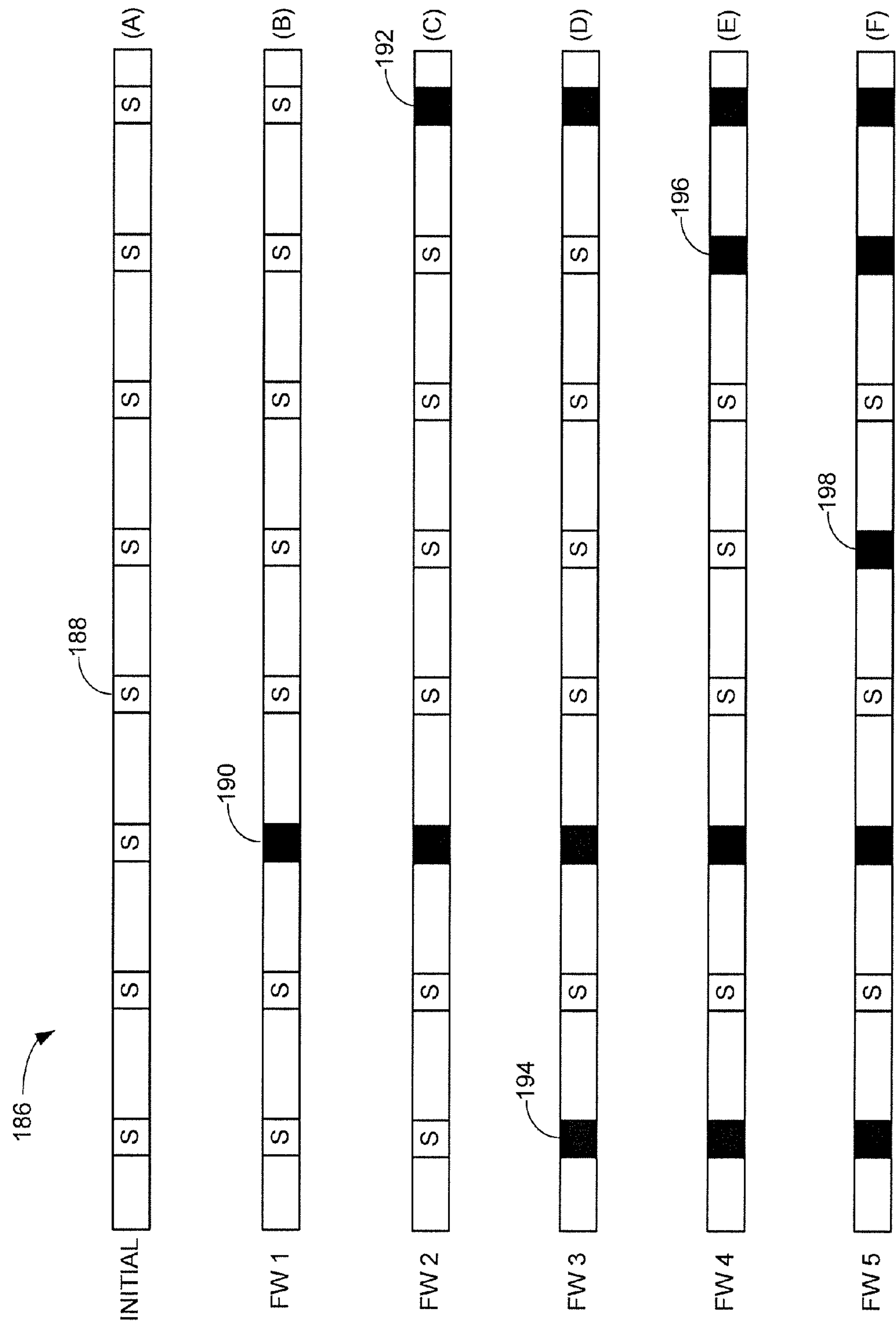
FIG. 8 is a schematic depiction of portions of special authentication tracks used to authenticate different versions of the firmware from FIG. 7.

FIG. 8 is a sequential diagram showing a portion of an authentication track 186 that may be used by the arrangement of FIG. 7. It is contemplated that a band of authentication tracks may be used, so the various features shown in FIG. 8, while limited to a small portion of a single track, would more generally likely be spread out over multiple tracks. A set of guard band tracks near an innermost or outermost diameter of the medium 120, for example, could be used as the authentication tracks. Control data could be stored to the authentication tracks, or the tracks could store "dummy data" that are not otherwise used by the system. In other embodiments, the authentication tracks can be specific data tracks on various data recording surfaces of the media so that the authentication tracks store user data in the data sectors thereon.

As shown by FIG. 8, the same authentication track 186 is sequentially shown in stages (A) through (F). Initially, the authentication track 186 has a sequence of embedded servo fields 188 nominally identical to the servo fields 130 discussed above, as indicated by stage (A). User data can be stored in the regions between the adjacent servo fields 188.

Stage (B) represents the installation of a first version of the firmware 182 from FIG. 7. This first version is referred to as FW 1, and involves the corruption of the servo data in selected servo field 190. The corruption of the servo field 190 may be carried out in a variety of ways, such as by erasing or overwriting portions of the servo field using the associated head. As noted above, this may require special instructions to assert a write gate signal as the head 120 passes adjacent the servo field 190 as well as the application of write current to the write element 116 (FIG. 2) to induce an error (overwrite or erase) the servo data.

At this point it will be noted that while only a single servo field 190 is corrupted, this is merely for purposes of illustration. In one example, an exemplary drive may have about 400 servo fields per track. Normally, a certain number of valid servo fields may be required in a row in order to reliably maintain track following perfoiniance, such as four (4) successive servo fields. Doubling this value to eight (8) to increase robustness, the device can then corrupt as many as 1/9 of the servo fields (that is, up to every ninth servo field) and still maintain robust servo control. For a track having 400 servo fields, then the track could permit up to 44 (400/9=44.4) servo fields with unduced errors, such as the servo field 190. Using ten (10) authentication tracks would thus allow up to 440 corrupted servo fields which should be more than adequate to handle the total number of firmware revisions expected for a given product life cycle.

It follows that for FW 1 at stage (B), while only a single corrupted servo field is shown at 190, any desired number of corrupted servo fields could be arranged along the track 186 within the constraints set forth above. In some embodiments, a total of 3-10 corruptions may be provided for each firmwave revision. It is not necessarily required that each later version of the firmware introduce the same number of corrupted servo fields.

Continuing with FIG. 8, stage (C) depicts an additional corrupted servo field 192 which was added during the installation of FW 2, an updated version of the firmware and the immediately successive version over FW 1. It will be noted that FW 2 both adds new error locations (servo field 192) and relies on the presence of the previous error locations for the previous version of the firmware (servo field 190).

FIG. 8 shows that FW 3 (stage (D)) adds corrupted servo field 194, FW 4 (stage (E)) adds corrupted servo field 196, and FW 5 (stage (F)) adds corrupted servo field 198. As stated above, it is contemplated that the corrupted servo fields would not be as proximate one another as depicted in FIG. 8, but this is not necessarily limiting.

From FIG. 8 it can be seen that each of the respective firmware versions has a unique signature or sequence of corrupted servo fields. Each firmware version can thus instruct a scan for its own unique signature as discussed above in FIG. 7 to ensure that a roll-back attack has not taken place. For example, once FW 5 has been installed, an attempt to roll back to any previous version of firmware may be defeated based on the presence of (at least) corrupted servo field 198.

Figure 9:
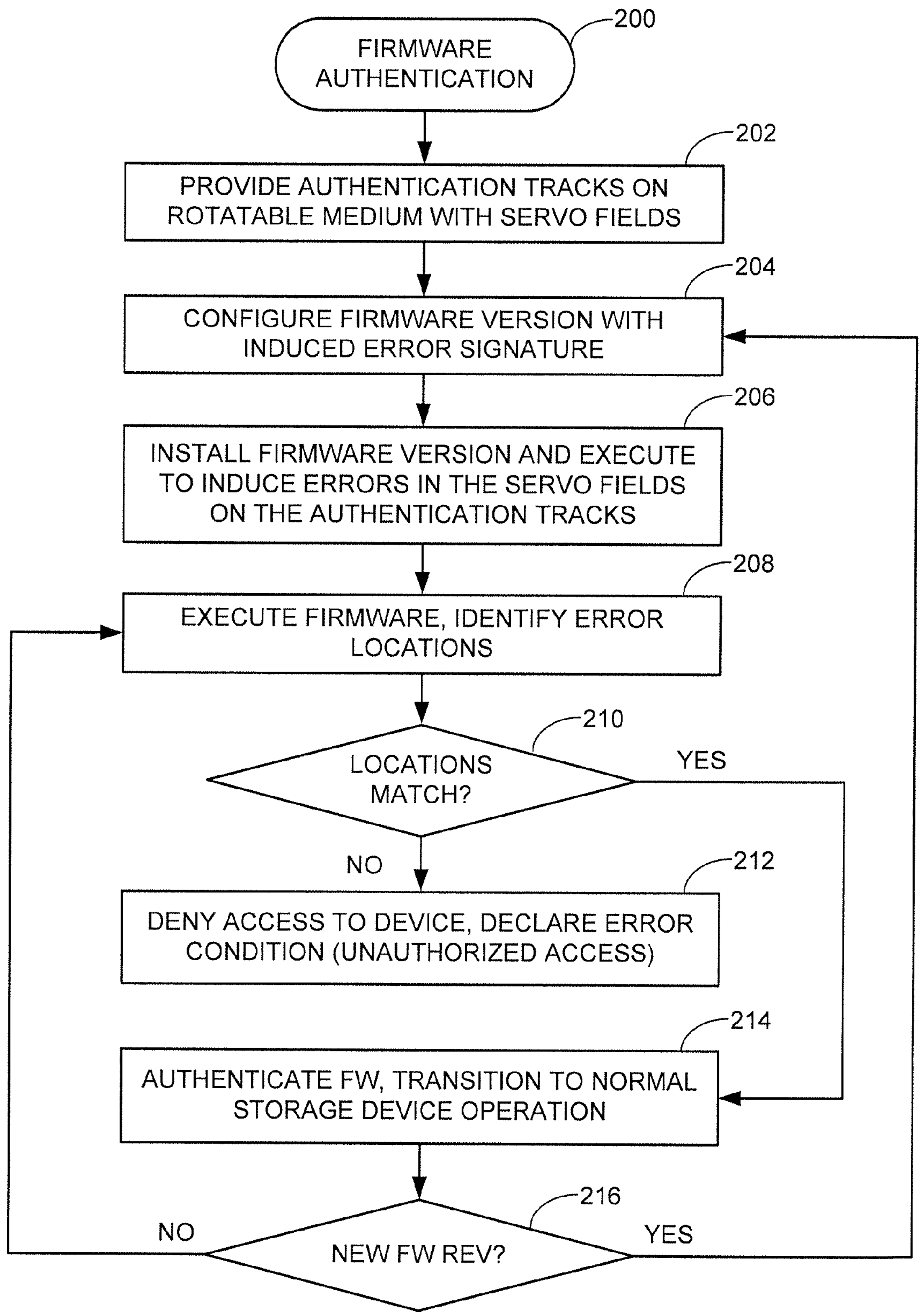
FIG. 9 is a flow chart for a firmware authentication routine illustrative of steps carried out in accordance with some embodiments.

FIG. 9 is a flow chart for a firmware authentication routine 200 to summarize the foregoing discussion. It is contemplated that various steps set forth in the routine may correspond to programming instructions carried out by one or more of the controllers 106, 172 in FIG. 7, or other aspects of the data storage device. The flow chart is merely illustrative and is not limiting. The various steps shown therein can be omitted, modified, augmented, performed in a different order, etc.

Step 202 commences with the provision of a data storage device having one or more authentication tracks formed on a rotatable medium, with each of the authentication tracks having a sequence of servo data fields such as discussed above in FIGS. 4-5 and 8.

At step 204, a particular firmware version (e.g., FW 1 from FIG. 8) is configured with a particular induced error signature for the purposes of authentication. The induced error signature will describe which servo field(s) on which track(s) are to be placed in a corrupted state. The servo fields may be counted sequentially from the once-around index location (e.g., the $32^{nd}$ servo field on track A, the $140^{th}$ and $312^{th}$ servo fields on track B, and so on).

The firmware is installed and executed at step 206. This will include operation of the device 100 to purposefully induce errors at the selected location in order to provide the desired pattern of corrupted servo fields. As noted above, the corruption of the servo fields may include the overwriting of the PS1/PS2 fields since these are the most difficult to recreate once erased. However, the corruption is not limited to this mechanism; other servo positioning fields shown in FIG. 4 may additionally or alternatively be corrupted as desired. A DC erase, or the writing of a different pattern, or the writing of substantially any data may be used. In some cases, RRO compensation values that provide large deviations of the head may be introduced (see e.g., RRO comp field 144, FIG. 4). Detecting a large excursion caused by an RRO compensation field, for example, may be ignored during write operations but could be used as a signifier of a special confirmation mark to the media for FW revision confirmation.

It is contemplated that the corruption of the servo fields occurs during the initial installation of the given firmware version (e.g., FW 1). Thereafter, such as during a subsequent initialization of the device 100, during a boot operation the firmwave will include instructions that cause the servo circuit to scan the authentication tracks for error conditions to identify the locations of servo fields that have been corrupted (see e.g., FIG. 8). This operation is represented at step 208.

Decision step 210 determines whether the error locations found during the scan match the signature; if not, access to the device is denied at step 212. This may take a number of forms, including the declaration of an error condition based on an improper version of the firmware having been installed. If the locations match, the flow passes to step 214 where the firmware is authenticated and the device 100 is transitioned to a normal mode to support host data transfer operations with the media.

It is contemplated that once a given version of firmware has been installed, steps 208 through 214 will be enacted each time that the device is re-initialized. As desired, the authentication tracks can be periodically scanned to determine whether any defects have grown and induced conditions that might be flagged as an error during a subsequent update.

Accordingly, decision step 218 determines whether a new firmware revision is to be installed; if not, the foregoing operation is repeated. If so, the process flow passes back to step 204 where the new firmware is configured to have a new signature, and new corruptions are added to the system.

The use of corrupted servo fields need not necessarily be limited to a band of authentication tracks as depicted in FIG. 5, nor is it necessarily required that the same tracks be scanned during each initialization. It will be noted that a given firmware version is looking for a pattern of corrupted servo fields; if all the fields that are expected to be corrupted are in fact corrupted, a high level of confidence can be achieved that the firmware is the proper version. A roll back attack can be thwarted if the scan includes corrupted servo fields that should be normally good fields for that level of firmware. Nevertheless, it is not necessarily required that all of the corrupted servo fields be located in order for the system to authenticate a given set of firmware.

Using less than all of the available authentication tracks and corrupted servo fields during a given initialization can further protect against motivated attackers who develop replacement firmware for malicious purposes. For example, if the system goes to the exact same tracks each time, the attacker may be able to, through a process of trial and error as well as observation, determine the mechanism that is in place and modify the firmware to either accept that new signature or ignore the output. Using a different sequence each time that the firmware is initialized will increase the difficulty in detecting the locations of the defective patterns.

Of course, if the attacker is able to write an entirely new set of firmware, then this authentication module of the finnware may be deleted. In practical terms, however, since the firmware is complex and governs so many basic functions, it is contemplated that even a sophisticated attacker will need to retain most of the existing firmware to operate the drive and add to it those features necessary to get around other security aspects of the systerm(e.g., locating encryption keys, etc.). Hence, the use of a random or repeating sequence of different tracks, along with a statistically large number of corrupted servo fields, can make this task more difficult and enhance the overall security of the user data stored by the device.

It will now be appreciated that the various embodiments can provide a number of benefits. By corrupting servo positioning data of the type that cannot be easily rewritten by the device, a unique signature can be provided to the media that corresponds to a given firmwave version. Unauthorized firmware upgrades, such as the attempt to roll back to a prior version or roll forward to a new version, can be equally thwarted if there are valid servo fields where corrupted ones should be, and if there corrupted servo fields where valid ones should be.

The various embodiments have contemplated the use of magnetic recording media, but this is merely exemplary and is not limiting. Substantially any form of rotatable media can be used. It is noted that the corruption of servo positioning data is superior to the corruption or damage of other locations, such as certain memory cells in a semiconductor memory, since a separate closed loop positioning system is used in the present embodiments to physically scan and position a control object (e.g., read/write head) and report back physical errors. This is in contrast to simply reading a memory location (e.g., the defect map 184) and noting the data values stored therein.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:

executing, by a programmable processor of a data storage device having a rotatable data recording medium on which is written pre-recorded servo positioning data used to position a data transducer, an instruction to corrupt a servo data location of the servo positioning data on the medium to authenticate the firmware; and detecting a firmware rollback attack responsive to a detected pattern of corrupted servo data locations on at least one data track having at least one additional corrupted servo data location not corrupted by the instruction in the firmware.

2. The method of claim 1, wherein the detecting step is carried out during a data storage device initialization sequence, and the method further comprises denying user access to remaining portions of the medium responsive to the detected firmwave rollback attack.

3. The method of claim 1, further comprising granting user access to the medium responsive to the detected pattern of corrupted servo data locations on the at least one data track matching the servo data location corrupted by the instruction in the firmware.

4. The method of claim 1, further comprising prior steps of installing a first version of the firmware and subsequently installing an updated, second version of the firmware, the first version of the firmware corrupting a first set of the servo data locations, the second version of the firmware corrupting a different, second set of the servo data locations without corrupting the first set of the servo data locations.

5. The method of claim 4, further comprising steps of initializing the data storage device, detecting the first and second sets of corrupted servo locations, denying user access to the medium responsive to a determination that the first version of the firmware is installed, and granting user access to the medium responsive to a determination that the second version of the firmware is installed.

6. The method of claim 1, wherein the servo positioning data comprises a plurality of embedded servo fields, each servo field comprising servo burst fields radially offset and written with alternating polarities to define a servo null point, and the instruction in the second version of the firmware erases or overwrites the servo burst fields in at least one of the plurality of embedded servo fields.

7. The method of claim 1, wherein the servo positioning data comprises a plurality of embedded servo fields, each servo field comprising a repeatable runout (RRO) compensation field that stores a multi-bit RRO compensation value to correct for radial error in a location of an adjacent servo null, and the instruction in the second version of the firmware writes a different RRO compensation value to a selected servo field configured to induce an offtrack movement of the transducer away from the adjacent servo null.

8. The method of claim 1, wherein the servo positioning data comprises servo fields arranged in the form of spaced apart servo wedges that continuously extend radially across the medium from an innermost diameter to an outermost diameter of the medium.

9. The method of claim 4, wherein the first and second versions of the firmware are respectively executed by a programmable processor of the data storage device.

10. The method of claim 1, wherein the medium comprises a band of authentication tracks defined thereon, each of the authentication tracks having a plurality of spaced apart servo fields, and wherein the executed instruction in the firmware corrupts selected ones of the servo fields on at least one of the authentication tracks, wherein at least a minimum plural number N of valid servo fields that are not subjected to corruption by the executed instruction are retained in between the corrupted servo fields on said at least one of the authentication tracks.

11. A method comprising:

providing a data storage device having a programmable processor, a memory, a rotatable data recording medium, and a data transducer configured to be positioned adjacent tracks defined on the medium to read data therefrom and write data thereto, the tracks comprising spaced apart servo fields which store servo positioning data to control the position of the transducer;

installing firmware to the memory;

using the programmable processor to, responsive to execution by the programmable processor of the firmware, direct the data transducer to overwrite a selected servo field on a selected track to corrupt the servo positioning data stored therein; and subsequently using the programmable processor to, responsive to execution by the programmable processor of the firmware, detect a firmware rollback attack by directing the data transducer to read the selected servo field on the selected track, denying access to remaining portions of the medium by a user responsive to detection of an error condition associated with the corrupted servo positioning data of the selected servo field and the detection of an error condition associated with an additional servo field on the selected track, and authorizing access to remaining portions of the medium by the user responsive to detection of the error condition associated with the corrupted servo positioning data of the selected servo field and an absence of an additional error condition associated with an additional servo field on the selected track.

12. The method of claim 11, wherein the firmware is characterized as a first version of firmware, and wherein the method further comprises:

installing an updated, second version of firmware to the memory to replace the first version of firmware;

using the programmable processor to, responsive to execution by the programmable processor of the second version of firmware, direct the data transducer to overwrite a second selected servo field on a selected track to corrupt the servo positioning data stored therein; and subsequently using the programmable processor to, responsive to execution by the programmable processor of the second version of firmware, direct the data transducer to read the selected servo field and the second selected servo field on the selected track and, responsive to an error condition associated with the corrupted servo positioning data of the selected servo field and the corrupted servo positioning data of the second selected servo field, authorize access to remaining portions of the medium by a user.

13. The method of claim 11, further comprising subsequently using the programmable processor to, responsive to execution by the programmable processor of the firmware, direct the data transducer to read the selected servo field on the selected track and deny access to remaining portions of the medium by a user responsive to a lack of an error condition associated with the selected servo field.

14. The method of claim 11, wherein the servo positioning data comprises servo burst fields radially offset and written with alternating polarities to define a servo null point, and the selected servo field is corrupted by erasing or overwriting the servo burst fields in the selected servo field.

15. The method of claim 11, wherein the servo positioning data comprises a repeatable runout (RRO) compensation field that stores a multi-bit RRO compensation value to correct for radial error in a location of an adjacent servo null, and the selected servo field is corrupted by writing a different RRO compensation value to the RRO compensation field of the selected servo field configured to induce an offtrack movement of the transducer away from the adjacent servo null.

16. The method of claim 11, further comprising using the processor to generate and store in a memory a grown defect list of servo fields having grown defects, wherein the additional servo field on the selected track is not listed in the grown defect list.

17. A data storage device, comprising:

a rotatable data recording medium on which is defined a plurality of concentric tracks, each track having spaced apart servo positioning data;

a data transducer configured to write data to and read data from the tracks;

a servo control circuit configured to position the data transducer adjacent the tracks using the servo positioning data;

a memory which stores a selected version of firmware; and a programmable processor configured to, responsive to execution of the firmware, provide firmware rollback protection by directing the data transducer to overwrite a selected subset of the servo fields on a selected track less than all of the servo fields on the selected track to corrupt the servo positioning data stored in the selected subset of the servo fields, directing the data transducer to subsequently read the selected subset of the servo fields on the selected track and, responsive to an error condition associated with the corrupted servo positioning data of the selected servo field, authorizing access to remaining portions of the medium by a user.

18. The data storage device of claim 17, wherein the programmable processor is further configured to, responsive to execution of the firmware, corrupt a plurality of servo fields on different tracks in accordance with a predefined signature, wherein during a subsequent initialization of the data storage device the programmable processor is configured to obtain a pattern of error locations of the servo fields having corrupted servo positioning data and compare the pattern to the predefined signature.

19. The data storage device of claim 17, wherein the servo positioning data comprises a plurality of embedded servo fields, each servo field comprising servo burst fields radially offset and written with alternating polarities to define a servo null point, and the programmable processor directs the erasing or overwriting by the transducer of the servo burst fields in at least one of the plurality of embedded servo fields.

20. The data storage device of claim 17, wherein the servo positioning data comprises a plurality of embedded servo fields, each servo field comprising a repeatable runout (RRO) compensation field that stores a multi-bit RRO compensation value to correct for radial error in a location of an adjacent servo null, and the programmable processor directs the writing of a new, different RRO compensation value to a selected servo field configured to induce an offtrack movement of the transducer away from the adjacent servo null.

* * * * *